United States Patent
Park et al.

(10) Patent No.: US 7,741,955 B2
(45) Date of Patent: Jun. 22, 2010

(54) ANTI-COLLISION METHOD AND SYSTEM USING OPTIMIZED BINARY SEARCH TREE

(75) Inventors: Kyung-ho Park, Suwon-si (KR); Woo-shik Kang, Suwon-si (KR); Young-hwan Jung, Seoul (KR); Sun-shin An, Seoul (KR); Seon-wook Kim, Namyangju-si (KR)

(73) Assignee: Samsung Electro-Mechanics Co., Ltd, Suwon-si (KR)

(*) Notice: Subject to any disclaimer, the term of this patent is extended or adjusted under 35 U.S.C. 154(b) by 1206 days.

(21) Appl. No.: 11/316,711

(22) Filed: Dec. 27, 2005

(65) Prior Publication Data
US 2006/0158312 A1 Jul. 20, 2006

(30) Foreign Application Priority Data
Jan. 12, 2005 (KR) .................. 10-2005-0002880

(51) Int. Cl.
*H04Q 5/22* (2006.01)
(52) U.S. Cl. .............. 340/10.2; 710/117; 710/120; 370/347
(58) Field of Classification Search ........... 340/10.1, 340/10.4; 710/117, 120; 370/347
See application file for complete search history.

(56) References Cited

U.S. PATENT DOCUMENTS

| | | | | |
|---|---|---|---|---|
| 5,978,795 A | * | 11/1999 | Poutanen et al. | 707/3 |
| 6,526,055 B1 | * | 2/2003 | Perlman et al. | 370/392 |
| 6,947,931 B1 | * | 9/2005 | Bass et al. | 707/6 |
| 7,315,522 B2 | * | 1/2008 | Wood, Jr. | 370/312 |
| 7,433,871 B2 | * | 10/2008 | Deforche et al. | 707/10 |
| 2006/0158312 A1 | * | 7/2006 | Park et al. | 340/10.2 |

FOREIGN PATENT DOCUMENTS

JP 08-036623 A 2/1996

* cited by examiner

*Primary Examiner*—Daniel Wu
*Assistant Examiner*—Bradley E Thompson
(74) *Attorney, Agent, or Firm*—Sughrue Mion, PLLC

(57) ABSTRACT

Method for rapidly detecting identifier (ID) of tags, by radio frequency identification (RFID) reader in communication system that includes RFID reader and at least two tags communicating with RFID reader, is provided. RFID reader generates a prefix when IDs contained in at least two messages received collide with each other, prefix including a first colliding bit, which is set to '0' or '1', from high-order bits and non-colliding high-order bits. RFID reader sends a first message containing information that requests transmission of an assigned ID in a preset transmission period when the bits of the generated prefix match bits corresponding to the prefix, in the assigned ID. Tags receive a first message that contains a prefix including at least one bit, and sends a second message containing an assigned ID during a preset transmission period when the bits of the prefix match bits corresponding to the prefix, in assigned ID.

18 Claims, 5 Drawing Sheets

ANTI-COLLISION METHOD AND SYSTEM USING OPTIMIZED BINARY SEARCH TREE

CROSS-REFERENCE TO RELATED APPLICATIONS

This application claims the benefit under 35 U.S.C. §119 (a) from Korean Patent Application No. 2005-02880 filed on Jan. 12, 2005, in the Korean Intellectual Property Office, the entire disclosure of which is incorporated herein by reference.

BACKGROUND OF THE INVENTION

1. Field of the Invention

Apparatuses and systems consistent with the present invention relate generally to radio frequency identification (RFID), and more particularly, to resolution of collisions between identifiers that occurs when a RFID reader receives identifiers from a plurality of RFID tags.

2. Description of the Related Art

RFID is used to identify various devices including portable terminals and various products. The RFID technology is being developed in response to the changes in production methods, the changes in consumption patterns, and cultural and technological developments, as an alternative to bar codes and magnetic cards. The RFID card is one of contactless cards. In most cases, the contactless cards refer to the RFID cards.

An RFID, unlike the contact card, does not require a user to insert a tag into a RFID reader, is robust to friction and damage, and is insensitive to contamination or environment owing to the absence of mechanical contacts. An RFID reader constantly emits radio waves. When entering a transmission range of the RFID reader, a tag transmits its own identifier (ID) and stored data. The RFID reader forwards the received data from the tag to a server, and the server compares the received data with a pre-stored database to provide intended services. At this time, the frequency of the signal used ranges from 10 kHz to 300 GHz. Primarily, the low frequency of 134.2 kHz is used. Hereafter, the main features of the RFID are described.

First, the RFID can rapidly identify multiple tags at the same time, and thus saves the time taken for identification. In this respect, the RFID is taking the place of bar codes or magnetic tags in logistics. Secondly, the RFID, which has a wide read-range, offers high applicability according to the specification of systems or environmental conditions. For instance, the RFID tag is used in a parking control system, in place of the existing contact smart cards. Thirdly, the RFID features excellent environmental resistance and long life duration. The user needs not to insert the card into the RFID reader, and the absence of mechanical contacts for the RFID tag reduces the error rate to a minimum under adverse conditions and tag damages due to severe contact, dust, humidity, temperature, snow, rain, and so forth. Thus, the RFID tag is widely used in systems deployed outdoors. Fourthly, the RFID features the penetration through non-metallic materials. Lastly, the identification of mobile objects with high speed is allowed. It takes only 0.01 to 0.1 seconds for the RFID reader to identify tags. With this feature, the RFID system can be deployed and applied to automatic fare collection systems on highways or in tunnels.

FIG. 1 illustrates a communication system constructed with a RFID reader 100 and a plurality of tags including TAG 1, TAG 2, TAG 3, TAG 4, TAG 5 and TAG 6. As explained above, the RFID reader 100 receives and transmits data to and from TAGs 1-6. It is assumed that the plurality of TAGs 1-6 is placed within the read-range of the RFID reader 100. When the plurality of TAGs 1-6 transfers, or transmits, their data or IDs at the same time, the RFID reader 100 receives corrupted data or IDs. In other words, the RFID reader 100 cannot accurately identify the received data or IDs. To prevent this, a binary search tree algorithm has been suggested, to be described with reference to FIG. 1.

Table 1 shows IDs assigned to TAGs 1-6 as shown in FIG. 1.

TABLE 1

| Tags | Assigned IDs |
|------|-------------|
| Tag 1 | 0000 1111 |
| Tag 2 | 0011 0011 |
| Tag 3 | 0101 0101 |
| Tag 4 | 1111 0000 |
| Tag 5 | 1100 1100 |
| Tag 6 | 1010 1010 |

The RFID reader 100 requests the TAGs 1-6 to transfer their assigned IDs so as to identify the tags placed in the read-range. Hereafter, a message transmitted from the RFID reader 100 is referred to as an ID request message. The RFID reader 100 transmits over its read-range an ID request message containing an ID of '1111 1111' at a first time point.

The TAGs 1-6, upon receiving the ID request message, compare the ID contained in the received ID request message with their assigned IDs. When their assigned IDs are smaller than or equal to the ID contained in the ID request message according to a result of the comparison, the TAGs 1-6 transfer their IDs to the RFID reader 100.

In detail, the TAGs 1-6 transfer their assigned IDs to the RFID reader 100 since their IDs are smaller than the ID contained in the ID request message. Hereafter, the message transmitted to the tag to the RFID reader 100 is referred to as an ID response message. However, the RFID reader 100 receives the colliding (corrupted) IDs from the TAGs 1-6. Typically, as the TAGs 1-6, which have received the ID request message, transmit their ID response messages at the same time, the RFID reader 100 receives the corrupted ID 'XXXX XXXX'.

The RFID reader 100 transmits at a second time point over its read-range another ID request message containing a reset ID in which a first corrupted bit value is reset to '0' and other bit values are reset to '1' based on a high-order bit of the corrupted ID. Hereafter, the lowest-order bit is referred to as a first bit and the highest-order bit is referred to as an eighth bit to facilitate the understanding of the present invention. Since the first corrupted bit, i.e., the highest-order corrupted bit, is the eighth bit, the ID contained in the ID request message is reset to '0111 1111'.

The TAGs 1-6, upon receiving the ID request message, compare the ID contained in the received ID request message with their assigned IDs. Only the TAGs 1-3 transfer their ID response messages according to the result of the comparison. However, the RFID reader 100 receives the corrupted ID, that is, '0XXX XXX1'. At a third time point, the RFID reader 100 transmits over its read-range yet another ID request message containing a reset ID in which the first corrupted bit value is reset to '0' and the other bit values are reset to '1' based on the highest-order of the corrupted bit of the corrupted ID. Specifically, since the seventh bit is the first corrupted bit, the ID contained in the ID request message is '0011 1111'.

Upon receiving the ID request message, the TAGs 1-6 compare the ID in the received ID request message with their assigned IDs. According to the result of the comparison, only the TAQs 1-2 transfer their ID response messages. Yet, the RFID reader 100 receives the corrupted ID, that is, '00XX XX11'. The RFID reader 100, at a fourth time point, transmits over its read-range still another ID request message containing a reset ID in which the first corrupted bit value is reset to '0' and the other bit values are reset to '1' based on the highest-order of the corrupted bit of the corrupted ID. Specifically, since the sixth bit is the first corrupted bit, the ID contained in the ID request message is '0001 1111'.

Upon receiving the ID request message, the TAGs 1-6 compare the ID in the received ID request message with their assigned IDs. According to the result of the comparisons, only the TAG 1 transfers the ID response message.

As such, the RFID reader 100 identifies the TAG 1 and performs operations to identify the TAGs 2-6. That is, the RFID reader 100 identifies only one tag at the fourth time point. At this time, the RFID reader 100 requests the TAG 1 not to send the ID response message. Upon the receiving the request, the first tag 110 does not send the ID response message even when the ID request message arrives.

By repeating the above procedure, the RFID reader 100 can recognize the IDs of the remaining tags in the sequence of TAG 2, TAG 3, TAG 6, TAG 5 and TAG 4. However, the conventional binary search tree algorithm degrades the efficiency because the collision probability increases as the number of the tags increases and the length of the ID assigned to the tag is lengthened. That is, the conventional binary search tree algorithm increases the number of transmissions of the ID request message as the number of the tags increases and the length of the ID assigned to the tags is lengthened.

SUMMARY OF THE INVENTION

An aspect of the present invention provides a method for rapidly detecting an ID assigned to tags by an RFID reader.

Another aspect of the present invention provides a method for keeping the time taken for a RFID reader to detect an ID assigned to tags, fixed even when the number of the tags increases or the ID of the tags is lengthened.

According to an aspect of the present invention, there is provided a method for detecting an ID of tags, the ID consisting of a plurality of bits, by an RFID reader in a communication system that includes the RFID reader and at least two tags communicating with the RFID reader, includes generating a prefix when IDs contained in at least two messages received collide with each other, the prefix including a first colliding bit, which is set to '0' or '1', from high-order bits and the non-colliding high-order bits; and sending a first message containing information that requests the transmission of an assigned ID in a preset transmission period when the bits of the generated prefix match bits corresponding to the prefix, in the assigned ID.

A method for transmitting an ID from tags, the ID consisting of a plurality of bits, to an RFID reader in a communication system that includes the RFID reader and at least two tags communicating with the RFID reader, includes receiving a first message that contains a prefix including at least one bit; and sending a second message containing an assigned ID during a preset transmission period when the bits of the prefix match bits corresponding to the prefix, in the assigned ID.

An ID detection system in a communication system that includes an RFID reader and at least two tags communicating with the RFID reader, includes the RFID reader for generating a prefix when IDs contained in at least two messages received collide with each other, the prefix including a first colliding bit, which is set to '0' or '1', from high-order bits and the non-colliding high-order bits, and sending a first message containing information that requests the transmission of an assigned ID during a preset transmission period when the bits of the generated prefix match bits corresponding to the prefix, in the assigned ID; and the tags for sending the second message containing the ID to the RFID reader.

An ID detection system in a communication system that includes an RFID reader and at least two tags communicating with the RFID reader, includes the RFID reader for transmitting a first message containing an ID; and the tags for receiving a first message that contains a prefix including at least one bit and sending a second message containing an assigned ID during a preset transmission period when the bits of the prefix match bits corresponding to the prefix, in the assigned ID.

BRIEF DESCRIPTION OF THE DRAWING FIGURES

These and/or other aspects of the invention will become apparent and more readily appreciated from the following description of exemplary embodiments, taken in conjunction with the accompanying drawing figures of which:

DETAILED DESCRIPTION OF THE EXEMPLARY EMBODIMENTS

Figure 1:
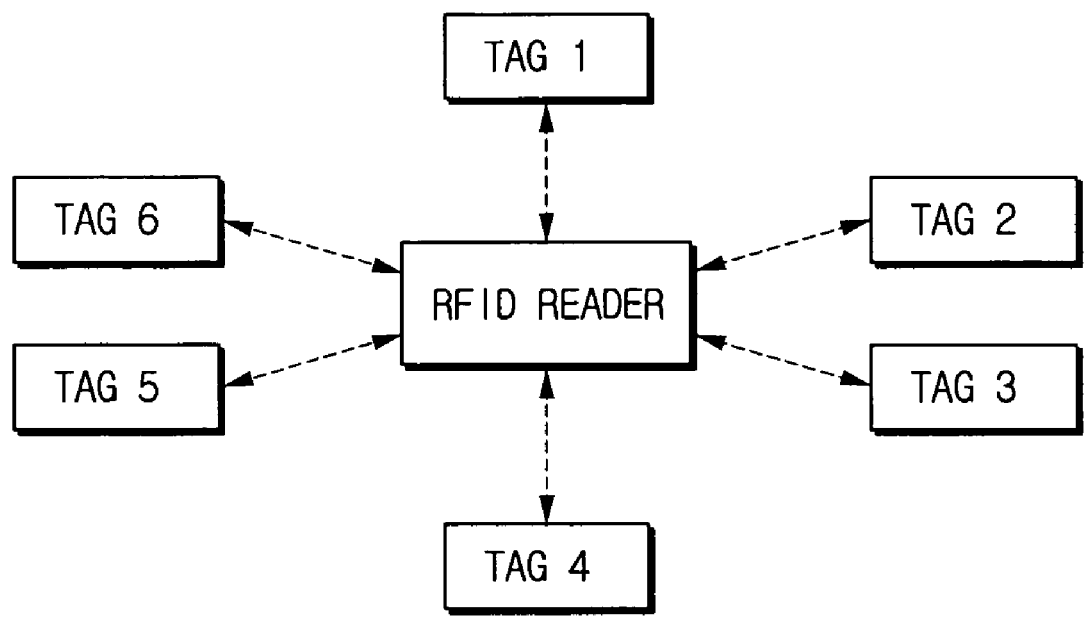
FIG. 1 illustrates a communication system constructed with an RFID reader and a plurality of tags.

Certain exemplary embodiments of the present invention will now be described in greater detail, with reference to the accompanying drawings.

In the following description, same drawing reference numerals are used for the same elements even in different drawings. The matters defined in the description, such as detailed construction and element descriptions, are provided to assist in a comprehensive understanding of the invention. Also, well-known functions or constructions are not described in detail since they would obscure the invention in unnecessary detail.

The present invention suggests an improved algorithm to read an ID assigned to tags, when compared with a conventional binary search tree algorithm, which will be explained below with reference to the attached drawings.

Figure 2:
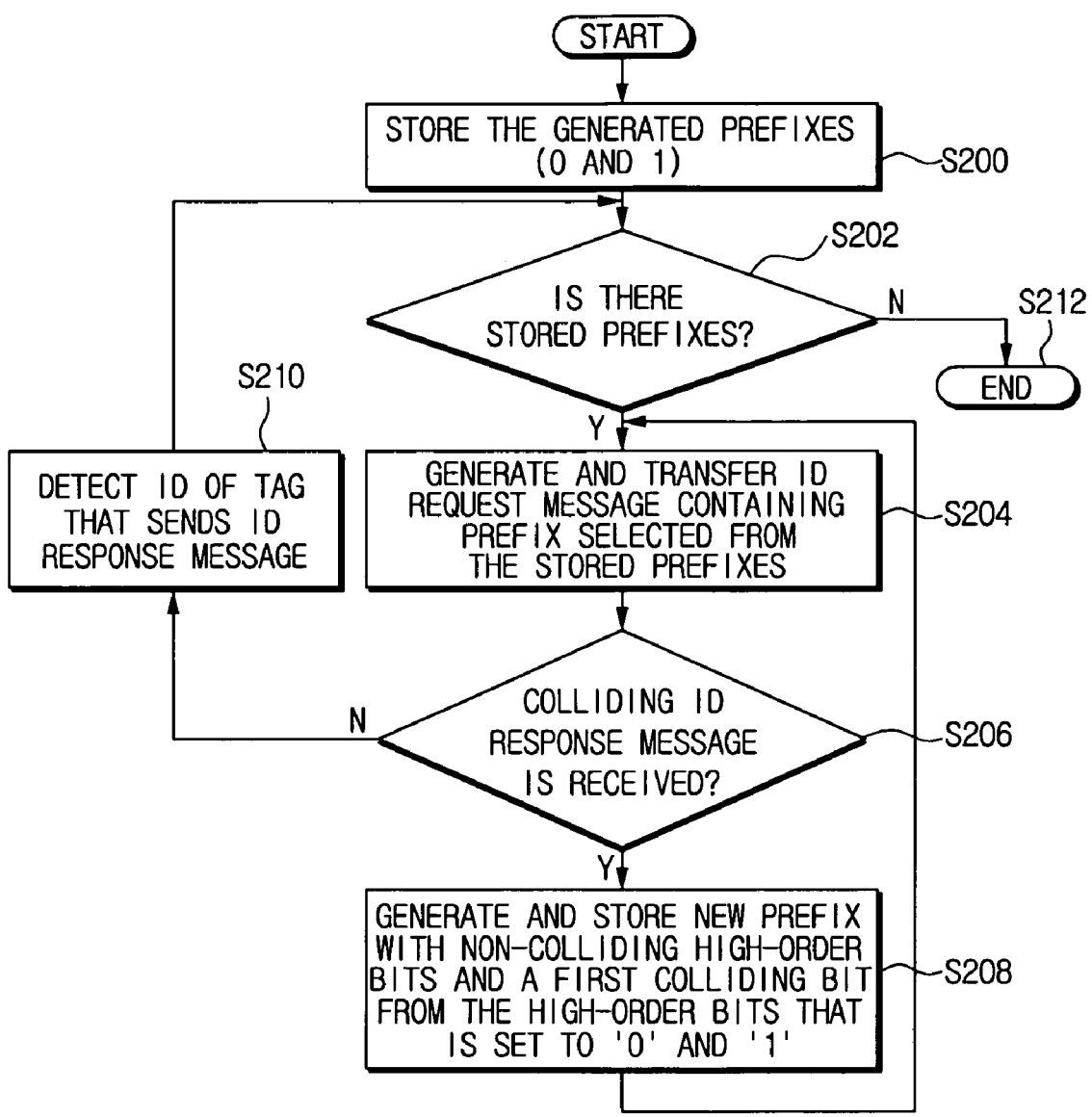
FIG. 2 is a flowchart outlining operations of an RFID reader according to an exemplary embodiment of the present invention.

FIG. 2 illustrates operations at an RFID reader according to an exemplary embodiment of the present invention.

The RFID reader stores generated prefixes in its memory (S200). Prefixes generated at the initial stage by the RFID reader are '0' and 1, to be set forth later. The RFID reader determines the presence or absence of the prefixes in the memory (S202). When the prefixes are stored in the memory according to the determination, the RFID reader proceeds to operation S204. Otherwise, since the absence of the prefixes in the memory implies that the RFID reader has identified all tags within its read-range, the RFID reader jumps to operation S212 where the operations end.

The RFID reader selects one of the stored prefixes and generates an ID request message containing the selected prefix (S204). The RFID reader transmits the generated ID request message to the tags placed in the read-range. The RFID reader determines whether IDs contained in an ID response message from the tags collide with each other (S206). As for the non-colliding IDs, the RFID reader proceeds to operation S210, and as for the colliding IDs, the RFID reader proceeds to operation S208.

The RFID reader generates a new prefix with non-colliding high-order bits and a first colliding bit from the high-order bits that is set to '0' and 1, and stores the generated prefix in its memory (S208). The RFID reader detects the ID of the tag that sends the ID response message by use of the ID contained the received ID response message (S210).

Figure 3:
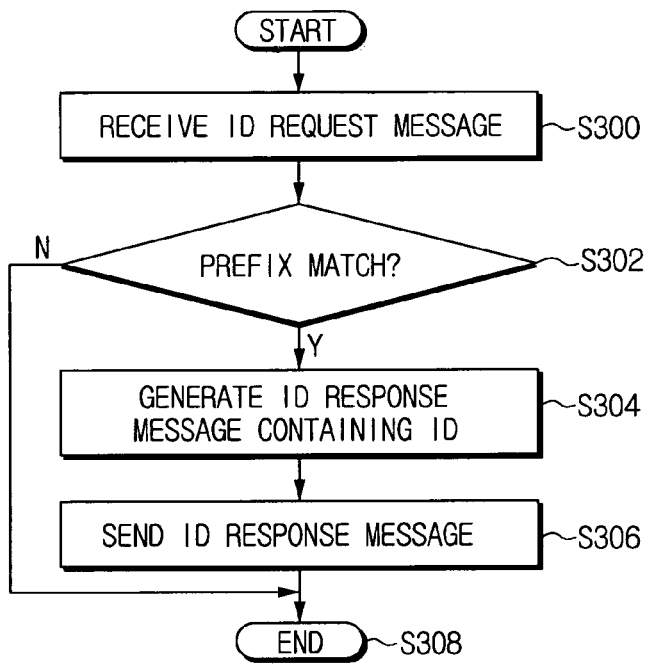
FIG. 3 is a flowchart outlining operations of a tag according to an exemplary embodiment of the present invention.

FIG. 3 outlines operations at a tag according to an exemplary embodiment of the present invention.

The tag receives an ID request message (S300). The tag determines whether the ID prefix contained in the ID request message matches its assigned ID (S302). The prefix is shown in FIG. 4.

Figure 4:
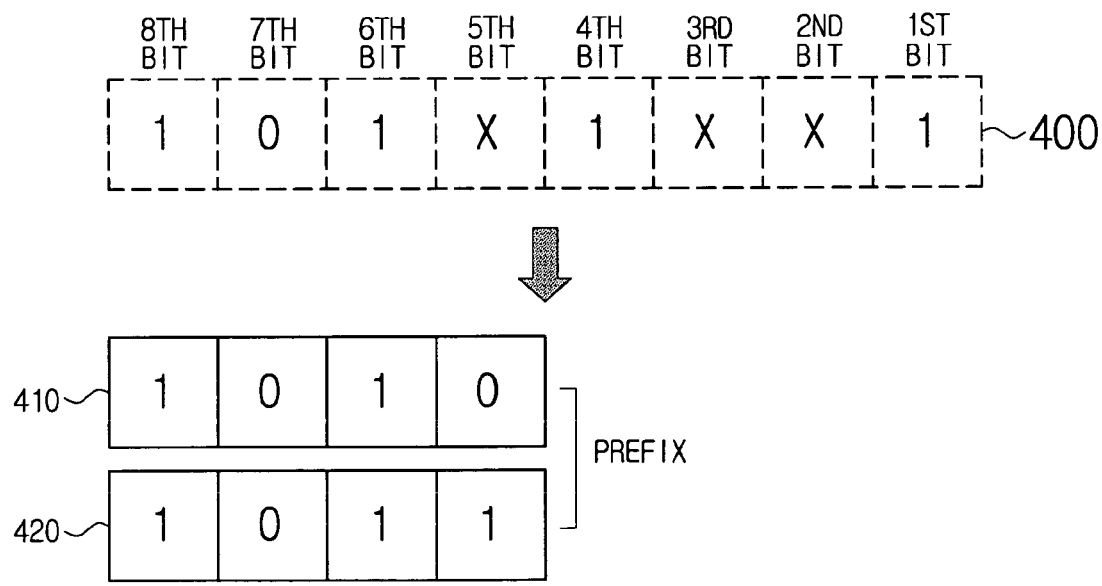
FIG. 4 illustrates an exemplary prefix according to an exemplary embodiment of the present invention.

FIG. 4 is an exemplary ID contained in the ID response message. The ID consists of first through eighth bits. The RFID reader receives the corrupted ID 400. The first corrupted bit from the high-order bit, i.e., the highest-order corrupted bit, is the fifth bit. The RFID reader generates prefixes with the eighth bit through the sixth bit retained and the corrupted fifth bit value set to '0' and '1'. As shown in the lower section of FIG. 4, the generated prefixes are '1010' and '1011'. The RFID reader stores the generated prefixes in its memory, selects one of the stored prefixes, and sends the selected prefix to tags placed in the read-range. For instance, provided that the RFID reader sends the prefix '1010', when the tag has high-order bits '1010', i.e., when the top four highest-order bits have the value '1010', the tag proceeds to operation S304. When the high-order bits of the tag are not '1010', the tag ends the operation (S308). The tag generates an ID response message containing its ID (S304) and sends the generated ID response message to the RFID reader (S306).

The following description describes a method for the RFID reader 100 to detect the ID assigned to the tag according to the algorithm of the present invention in relation to Table 1.

The RFID reader 100 generates the ID request message containing the prefix at a first time point. For instance, the first set of generated prefixes at the first time point are '0' and '1'. The RFID reader 100 stores the first set of generated prefixes in the memory. Table 2 shows the prefixes stored in the memory.

TABLE 2

| Prefix | 0, 1 |
|---|---|

The RFID reader 100 selects one of the stored prefixes and generates an ID request message containing the selected prefix. For instance, the RFID reader 100 generates the ID request message with the prefix '0' and sends the generated ID request message to the TAGs 1-6 within the its read-range. Hereinafter, it should be appreciated that the RFID reader 100 removes a selected prefix from the memory.

The TAGs 1-6 compare the prefix in the received ID request message with their assigned IDs. When the assigned IDs match the received prefix according to a result of the comparison, the tags with matching IDs generate and send an ID response message containing their assigned IDs to the RFID reader 100. Specifically, the TAGs 1-3, which have the eighth bit value '0' in their assigned IDs, generate their ID response messages. The TAGs 4-6, which have the eighth bit value '1' in their assigned IDs, do not generate their ID response messages.

The IDs in the ID responses message from the TAGs 1-3 collide with each other and the corrupted IDs arrive at the RFID reader 100. That is, the RFID reader 100 receives the corrupted ID '0XXX XXX1'. Thus, the RFID reader 100 generates a second set of prefixes with the non-colliding high-order bits and the first colliding bit from the high-order bits that is set to '0' and '1', and updates its memory using the generated prefixes. Table 3 shows the updated prefixes based on Table 2, the updated prefixes including 1 from the first set of prefixes and including the second set of prefixes.

TABLE 3

| Prefix | 1, 00, 01 |
|---|---|

At a second time point, the RFID reader 100 selects one from the second set of prefixes stored in the memory and generates the ID request message containing the selected prefix. For instance, the RFID reader 100 generates the ID request message including the prefix '00' and sends the generated ID request message to the TAGs 1-6 in the read-range.

The TAGs 1-6 compare the prefix in the received ID request message with their assigned IDs. When their assigned IDs match the received prefix, the tags with matching IDs generate ID response messages containing the assigned IDs and send the generated ID response messages to the RFID reader 100. Particularly, TAGs 1 and 2, which have the assigned IDs with the high-order bits (the eighth bit and the seventh bit) '00', generate their ID response messages. The TAGs 3-6 do not generate their ID response messages because the eighth bit and the seventh bit of their assigned IDs are not '00'.

The IDs of the ID response messages from the TAGs 1 and 2 collide with each other and the corrupted IDs arrive at the RFID reader 100. That is, the RFID reader 100 receives the corrupted ID '00XX XX11'. Thus, the RFID reader 100 generates a third set of prefixes with the non-colliding high-order bits and the first colliding bit from the high-order bits that is set to '0' and '1', and updates its memory using the generated prefixes. Table 4 shows the updated prefixes based on Table 3, the updated prefixes including 1 and 01 respectively remaining from the first set of prefixes and the second set of prefixes, and including the third set of prefixes.

TABLE 4

| Prefix | 1, 01, 000, 001 |
|---|---|

At a third time point, the RFID reader 100 selects one from the third set of prefixes stored in the memory and generates an ID request message containing the selected prefix. For instance, the RFID reader 100 generates the ID request message including the prefix '000' and sends the generated ID request message to the TAGs 1-6 in the read-range.

The TAGs 1-6 compare the prefix in the received ID request message with their assigned IDs. According to the result of the comparison, only the TAG 1 sends an ID response message containing its ID. The RFID reader 110 detects the ID contained in the ID response message from the TAG 1.

At a fourth time point, the RFID reader 100 selects one of the remaining prefixes stored in the memory and generates an ID request message containing the selected prefix. For instance, the RFID reader 100 generates the ID request message including the prefix '001' and sends the generated ID request message to the TAGs 1-6 in the read-range.

The TAGs 1-6 compare the prefix in the received ID request message with their assigned IDs. According to the result of the comparison, only the TAG 2 sends an ID response message containing its ID. The RFID reader 110 detects the ID contained in the ID response message from the TAG 2.

At a fifth time point, the RFID reader 100 selects one of the remaining prefixes stored in the memory and generates an ID request message containing the selected prefix. For instance, the RFID reader 100 generates the ID request message including the prefix '01' and sends the generated ID request message to the TAGs 1-6 in the read-range.

The TAGs 1-6 compare the prefix in the received ID request message with their assigned IDs. According to the result of the comparison, only TAG 3 sends an ID response message containing its ID. The RFID reader 110 detects the ID contained in the ID response message from TAG 3. As such, the RFID reader 110 can detect the IDs assigned to TAGs 1-3. Table 5 shows the prefix still stored in the memory after the execution of the above operations.

TABLE 5

| Prefix | 1 |
|---|---|

Hereafter, descriptions are made on how the RFID reader 100 detects the IDs assigned to TAGs 4-6.

At a sixth time point, the RFID reader 100 generates an ID request message containing the stored prefix. That is, the RFID reader 100 generates the ID request message including the prefix '1' and sends the generated ID request message to the TAGs 1-6 in the read-range.

The TAGs 1-6 compare the prefix in the received ID request message with their assigned IDs. According to the result of the comparison, only TAGs 4-6 send ID response messages containing their IDs. The IDs in the ID response messages from TAGs 4-6 collide with each other and arrive at the RFID reader 100. That is, the RFID reader 100 receives the corrupted ID '1XXX XXX0'. Hence, the RFID reader 100 generates a fourth set of prefixes with the non-colliding high-order bit and the first colliding bit from the high-order bit that is set to '0' and '1', and updates its memory using the generated prefixes. Table 6 shows the updated prefixes based on Table 5.

TABLE 6

| Prefix | 10, 11 |
|---|---|

At a seventh time point, the RFID reader 100 selects one of the prefixes stored in the memory and generates an ID request message containing the selected prefix. For instance, the RFID reader 100 generates the ID request message including the prefix '10' and sends the generated ID request message to the TAGs 1-6 in the read-range.

The TAGs 1-6 compare the prefix in the received ID request message with their assigned IDs. According to the result of the comparison, only the TAG 6 sends an ID response message containing its ID. The RFID reader 110 detects the ID contained in the ID response message from the TAG 6.

At an eighth time point, the RFID reader 100 selects one of the prefixes stored in the memory and generates an ID request message containing the selected prefix. For instance, the RFID reader 100 generates the ID request message including the prefix '11' and sends the generated ID request message to the TAGs 1-6 in the read-range.

The TAGs 1-6 compare the prefix in the received ID request message with their assigned IDs. According to the result of the comparison, only TAGs 4 and 5 send ID response messages containing their IDs. The IDs in the ID response messages from TAGs 4 and 5 collide with each other and arrive at the RFID reader 100. That is, the RFID reader 100 receives the corrupted ID '11XX XX00'. Hence, the RFID reader 100 generates a fifth set of prefixes with the non-colliding high-order bits and the first colliding bit from the high-order bits that is set to '0' and '1', and updates its memory using the generated prefixes. Table 7 shows the updated prefixes based on Table 6.

TABLE 7

| Prefix | 110, 111 |
|---|---|

At a ninth time point, the RFID reader 100 selects one of the prefixes stored in the memory and generates an ID request message containing the selected prefix. For instance, the RFID reader 100 generates the ID request message including the prefix '110' and sends the generated ID request message to the TAGs 1-6 in the read-range.

The TAGs 1-6 compare the prefix in the received ID request message with their assigned IDs. According to the result of the comparison, only the TAG 5 sends an ID response message containing its ID. The RFID reader 110 detects the ID contained in the ID response message from the TAG 5.

At a tenth time point, the RFID reader 100 selects one of the remaining prefixes stored in the memory and generates an ID request message containing the selected prefix. For instance, the RFID reader 100 generates the ID request message including the prefix '111' and sends the generated ID request message to the TAGs 1-6 in the read-range.

The TAGs 1-6 compare the prefix in the received ID request message with their assigned IDs. According to the result of the comparison, only the TAG 4 sends an ID response message containing its ID. The RFID reader 110 detects the ID contained in the ID response message from the TAG 4. By repeating the above procedure, the RFID reader 100 can detect the IDs of the TAGs 1-6 placed in the read-range.

In the above exemplary embodiment, one of the remaining prefixes from the prefix set created last is selected or the sole remaining prefix is selected. In another exemplary embodiment, any one of the remaining prefixes is selected.

The following is an explanation of how the RFID reader 100 detects the ID of the tag according to the time division multiple access (TDMA) scheme.

Figure 5:
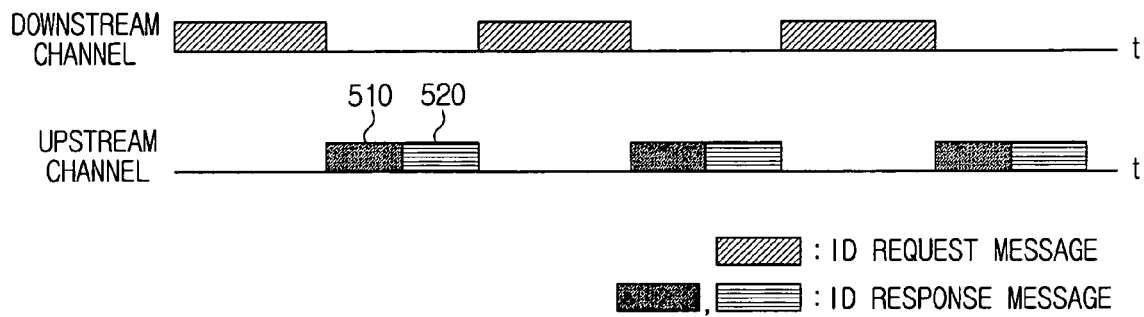
FIG. 5 illustrates two upstream and downstream channels according to an exemplary embodiment of the present invention.

FIG. 5 depicts upstream and downstream channels separated from one radio resource based on time. Referring to FIG. 5, the upstream channel is divided into two channels: a first upstream channel 510 and a second upstream channel 520. The RFID reader 100 transfers the ID request message on a transmit channel. The TAGs 1-6 send the ID response message on one of the first and second upstream channels 510, 520.

How the RFID reader 100 detects the IDs of the tags is elucidated below with reference to Table 1. At the first time point, the RFID reader 100 generates the ID request message containing the prefix, for instance, the prefixes '0' and '1'. The RFID reader 100 stores the generated prefixes. The first set of prefixes stored in the memory are shown in Table 2.

The RFID reader 100 selects one of the stored prefixes and generates the ID request message containing the selected prefix. For example, the RFID reader 100 generates and transmits the ID request message containing the prefix '0' to the TAGs 1-6 located in the read-range. Note that the RFID reader 100 removes the selected prefix from the memory.

The TAGs 1-6 compare the prefix in the received ID request message with their assigned IDs. When the assigned IDs match the received prefix according to the comparison, the tags with matching IDs generate and send the ID response message containing the assigned IDs to the RFID reader 110. As the eighth bit of the assigned IDs is '0', the TAGs 1-3 generate the ID response message while the TAGs 4-6 do not generate the ID response message due to the eighth bit '1' of their assigned ID. At this time, the TAGs 1 and 2 having the seventh bit '0' sends the ID response messages on the first upstream channel 510, and the TAG 3 having the seventh bit '1' sends the ID response message on the second upstream channel 520.

The RFID reader 100 detects the ID contained in the ID response message transferred on the second upstream channel 520 from the TAG 3. Meanwhile, the IDs in the ID response message from the TAGs 1 and 2 collide with each other and arrive at the RFID reader 100. That is, the RFID reader 100 receives the corrupted ID '00XX XX11'. Hence, the RFID reader 100 generates a sixth set of prefixes with the non-colliding high-order bits and the first colliding bit from the high-order bits that is set to '0' and '1', and updates its memory using the generated prefixes. Table 8 shows the updated prefixes based on Table 2.

TABLE 8

| Prefix | 1, 000, 001 |
|---|---|

At the second time point, the RFID reader 100 selects one of the sixth set of prefixes stored in the memory and generates an ID request message containing the selected prefix. For instance, the RFID reader 100 generates the ID request message including the prefix '000' and sends the generated ID request message to the TAGs 1-6 in the read-range.

The TAG 1, whose assigned ID has the eighth through sixth bits '000', generates an ID response message. The TAG 1, whose fifth bit is '0', sends the generated ID response message on the first upstream channel 510. The RFID reader 100 detects the ID contained in the ID response message transferred on the first upstream channel 510 from the first tag 110.

At the third time point, the RFID reader 100 selects one of the prefixes stored in the memory and generates an ID request message containing the selected prefix. For instance, the RFID reader 100 generates the ID request message including the prefix '001' and sends the generated ID request message to the TAGs 1-6 in the read-range.

The TAG 2, whose assigned ID has the eighth through sixth bits '001', generate an ID response message. The TAG 2, whose fifth bit is '1', sends the generated ID response message on the second upstream channel 520. The RFID reader 100 detects the ID contained in the ID response message transferred on the second upstream channel 520 from the TAG 2.

At the fourth time point, the RFID reader 100 generate an ID request message that contains the prefix '1' stored in the memory and sends the generated ID request message to the TAGs 1-6 in the read-range.

The TAGs 1-6 compare the prefix in the received ID request message with their assigned IDs. When the assigned IDs match the received prefix according to the result of the comparison, the tags with the matching ID generate and send an ID response message containing the assigned IDs to the RFID reader 100. In particular, the TAGs 4-6, whose eighth bit of the assigned IDs is '1', generate the ID response messages while the TAGs 1-3 do not generate the ID response message since the eighth bit of the assigned IDs is '0'. The TAG 6 having the seventh bit '0' sends the ID response message on the first upstream channel 510, and the TAGs 4 and 5 having the seventh bit '1' send their ID response messages on the second upstream channel 510.

The RFID reader 100 can detect the ID contained in the ID response message transferred on the first upstream channel from the sixth tag 120. Yet, the IDs in the ID response message from the fourth and fifth tags 116 and 118 collide with each other and arrive at the RFID reader 100. In other words, the RFID reader 100 receives the corrupted ID '11XX XX00'.

At the fifth time point, the RFID reader 100 selects one of the prefixes stored in the memory and generates an ID request message containing the selected prefix. For instance, the RFID reader 100 generates the ID request message including the prefix '110' and sends the generated ID request message to the TAGs 1-6 in the read-range.

The TAG 5, whose assigned ID has the eighth through sixth bits '110', generate an ID response message. The TAG 5, whose fifth bit is '0', sends the generated ID response message on the first upstream channel 510. The RFID reader 100 detects the ID contained in the ID response message transferred on the first upstream channel 510 from the TAG 5.

At the sixth time point, the RFID reader 100 generates an ID request message that contains the prefix '111' stored in the memory and sends the generated ID request message to the TAGs 1-6 in the read-range.

The TAG 4 generates an ID response message since the eighth through sixth bits of the assigned ID are '111'. The TAG 4 sends the generated response message on the second upstream channel 520 owing to the fifth bit '1'. The RFID reader 100 detects the ID contained in the ID response message transferred on the second upstream 520 channel from the TAG 4.

In effect, the number of transmissions of the ID request message can be reduced according to the TDMA scheme. As the RFID reader 100 is aware of the prefix, the tag sends only the bits other than the prefix as the ID contained in the ID response message, instead of its whole assigned ID. As a result, the volume of data transmitted and received is reduced. Although the descriptions are provided with respect to the two upstream channels to aid in the understanding, the number of the upstream channel is variable according to a user's setting. For instance, as to four upstream channels, the tag sends its assigned ID depending on the two low-order bits of the prefix.

Figure 6:
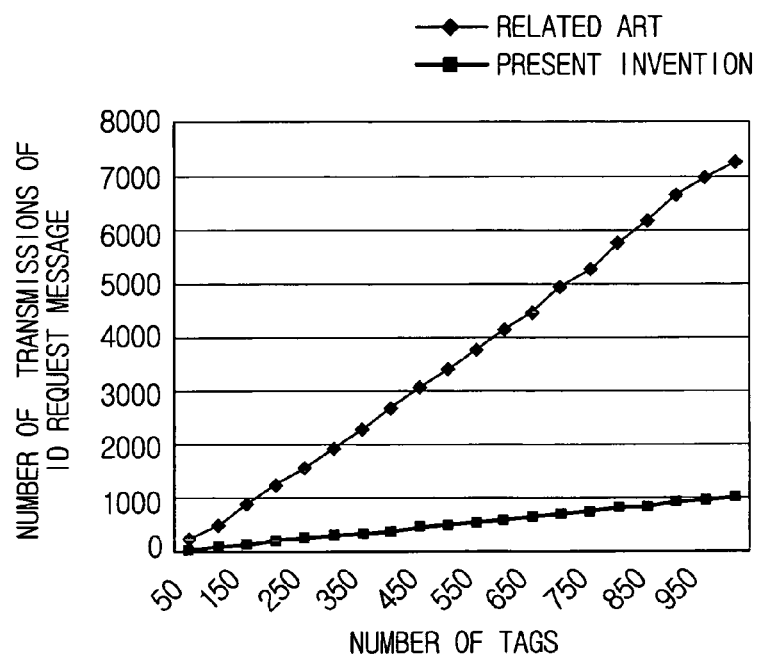
FIG. 6 is a graph showing effects of an exemplary embodiment of present invention.
Figure 7:
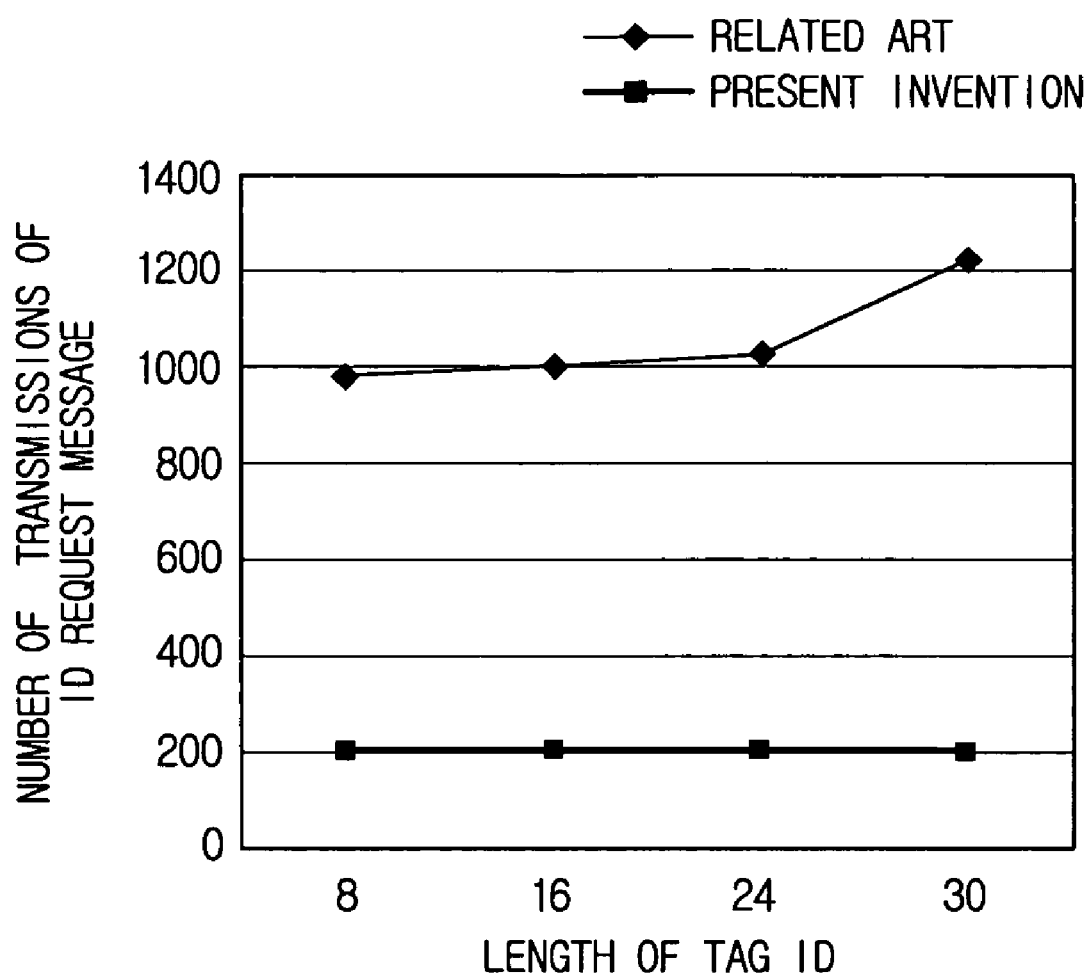
FIG. 7 is a graph showing effects of an exemplary embodiment of present invention.

FIGS. 6 and 7 show exemplary effects of the present invention. To be specific, FIG. 6 shows the number of transmissions of the ID request message depending on the number of tags, and FIG. 7 shows the number of transmissions of the ID request message depending on the length of the tag ID. As shown in FIG. 6 and FIG. 7, the present invention can drastically reduce the number of transmissions of the ID request message when compared with the related art.

As set forth above, the present invention can reduce the detection time of the tags by decreasing the number of transmissions of the ID request message and the ID response message. As for the lengthy tag ID, even when the number of tags to be identified increases, the present invention shows better performance than the conventional algorithm. In brief, the number of transmissions of the ID request message is independent from the length of the tag. In addition, the power consumed by the tags can be saved in view of the number of the transmissions of the ID request message and the ID response message. Furthermore, the present invention eliminates the need for the RFID reader to request the identified tags not to send their ID response messages.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method for detecting an identifier (ID) of radio frequency (RF) devices, the ID consisting of a plurality of bits, the method comprising:

generating a first prefix and a second prefix when a first ID in a first message collides with a second ID in a second message to generate a third ID, the first prefix and the second prefix both including at least one non-colliding high-order bit if the third ID includes the at least one non-colliding high-order bit and a highest-order first colliding bit of the third ID, wherein the highest-order first colliding bit of the first prefix and the second prefix are set to '0' and '1', respectively, and sending a third message which contains information that requests a transmission of an assigned ID in a preset transmission period if bits of the generated first prefix and second prefix match corresponding bits in the assigned ID.

2. The method of claim 1, wherein a transmission period of the first message and the second message and a transmission period of the third message are arranged in an alternating temporal manner.

3. The method of claim 2, wherein the transmission period of the first message and the second message includes a first transmission period and a second transmission period.

4. The method of claim 3, wherein the first message is transmitted during the first transmission period if a low-order bit of the first ID is '0', and the second message is transmitted during the second transmission period if a low-order bit of the second ID is '1'.

5. The method of claim 4, wherein an order of the low-order bit of the first ID is lower than the highest-order first colliding bit of the first prefix and the second prefix.

6. The method of claim 1, wherein the information that requests the transmission of the assigned ID, requests a transmission of bits of the assigned ID other than the corresponding bits in the assigned ID.

7. The method of claim 1, wherein the information requests the transmission of the assigned ID only to an RF device having the assigned ID.

8. The method of claim 1, wherein the highest-order colliding bit is a corrupted bit not identifiable to any ID.

9. The method of claim 1, wherein an order of the at least one non-colliding high-order bit is higher than an order of the highest-order first colliding bit.

10. A method for transmitting an identifier (ID) from radio frequency (RE) devices, the ID consisting of a plurality of bits, to an RF reader communicating with the RF devices, the method comprising:

receiving a first message that contains a prefix including at least one bit; and sending a second message containing an assigned ID during a preset transmission period if the at least one bit of the prefix matches corresponding at least one bit in the assigned ID, wherein the prefix is one of a first prefix and a second prefix, the first prefix and the second prefix both including at least one non-colliding high-order bit and a highest-order first colliding bit, wherein the highest-order first colliding bit of the first prefix and the second prefix are set to '0' and '1', respectively.

11. The method of claim 10, wherein a transmission period of the first message and a transmission period of the second message are arranged in an alternating temporal manner.

12. The method of claim 11, wherein the transmission period of the second message includes a first transmission period and a second transmission period.

13. The method of claim 12, wherein an RF device transmits the assigned ID during the first transmission period if a low-order bit of the assigned ID is '0', and the RF device transmits the assigned ID during the second transmission period if the low-order bit is '1'.

14. The method of claim 12, wherein an RF device transmits bits of the assigned ID other than the corresponding at least one bit in the assigned ID if the at least one bit of the prefix matches the corresponding at least one bit in the assigned ID.

15. An identifier (ID) detection system comprising a first radio frequency (RF) device and a second RF device and a third RF device, the second device and the third RF device communicating with the first RF device, wherein:

the first RF device generates a first prefix and a second if a first ID contained in a first message and a second ID contained in a second message collide with each other to generate a third ID, the first prefix and the second prefix both including at least one non-colliding high-order bit if the third ID includes the at least one non-colliding high-order bit and a highest-order first colliding bit of the third ID, wherein the highest-order first colliding bit of the first prefix and the second prefix are set to '0' and '1', respectively, and sending a third message which contains information that requests a transmission of an assigned ID during a preset transmission period if bits of the generated first prefix and second prefix match corresponding bits in the assigned ID; and the second RF device and the third RF device are operable to respectively send the first message containing the first ID and the second message containing the second ID, to the first RF device.

16. The ID detection system of claim 15, wherein a transmission period of the first message and the second message and a transmission period of the third message are arranged in an alternating temporal manner.

17. The ID detection system of claim 16, wherein the transmission period of the first message and the second message includes a first transmission period and a second transmission period.

18. The ID detection system of claim 15, wherein the first RF device requests the transmission of bits of the assigned ID other than the bits of the assigned ID corresponding to the bits of the generated first prefix and second prefix if the bits of the generated first prefix and second prefix match corresponding bits of the assigned ID.

* * * * *